United States Patent [19]

Dunseith

[11] 4,376,638

[45] Mar. 15, 1983

[54] METHOD AND APPARATUS FOR CHARGING A FILTER COMPARTMENT TO ISOLATE THE COMPARTMENT WITHIN A BAGHOUSE INSTALLATION

[75] Inventor: S. Michael Dunseith, Louisville, Ky.

[73] Assignee: Allis-Chalmers Corporation, Milwaukee, Wis.

[21] Appl. No.: 310,132

[22] Filed: Oct. 9, 1981

[51] Int. Cl.³ .............................................. B01D 46/04
[52] U.S. Cl. .......................................... 55/20; 55/73; 55/96; 55/97; 55/266; 55/287
[58] Field of Search ................... 55/20, 21, 80, 96, 97, 55/261, 266, 267, 269, 286, 287, 288, 302, 303, 73

[56] References Cited

U.S. PATENT DOCUMENTS

| | | | |
|---|---|---|---|
| 3,057,137 | 10/1972 | Perus et al. | 55/303 |
| 3,266,225 | 8/1966 | Barr | 55/303 |
| 3,325,979 | 6/1967 | Smith | 55/302 |
| 3,630,004 | 12/1971 | Adair et al. | 55/286 |
| 3,945,400 | 3/1976 | Slakey | 55/302 |
| 4,010,013 | 3/1977 | Murayama | 55/266 |
| 4,277,255 | 7/1981 | Apelgren | 55/20 |

*Primary Examiner*—David L. Lacey
*Attorney, Agent, or Firm*—Thomas G. Anderson

[57] ABSTRACT

A method and apparatus for isolating one or more of the filter compartments in a baghouse installation wherein an air damper is provided on each of the compartments to admit heated ambient air into each of the isolated compartments to prevent flue gases from seeping into the compartment.

7 Claims, 4 Drawing Figures

METHOD AND APPARATUS FOR CHARGING A FILTER COMPARTMENT TO ISOLATE THE COMPARTMENT WITHIN A BAGHOUSE INSTALLATION

BACKGROUND OF THE INVENTION

1. Field of the Invention

The present invention relates to a flue gas cleaning system and in particular to a method and apparatus for minimizing condensation of corrosive agents in the filter compartments of a baghouse installation.

2. Description of the Prior Art

In the typical baghouse installation, flue gases are drawn from a common inlet manifold into a bank of filter compartments wherein the gases are filtered through a plurality of filter bags to remove the suspended particulates from the gases. The filtered gases then exit the compartments and flow into a common outlet manifold from which they are directed into a chemical scrubber to remove the sulfur oxides and other corrosive agents in the gases prior to discharging them into the atmosphere.

In systems of this type, it has been the practice to admit the gases into the filter compartments at a temperature above the dew point temperature of the corrosive agents in the gases while maintaining a relatively uniform gas flow through each of the compartments. This prevents the formation of stagnate gas zones in the filter compartments where the gases could cool down below the dew point of the corrosive agents which would cause the agents to condense in the compartments. For this reason, it has generally been necessary to close off or isolate one or more of the filter compartments when the gas flow rate drops due to a reduced load on the boilers served by the system in order to maintain an adequate flow rate in the remaining compartments. However, when one of the compartments is isolated, the flue gases trapped in the compartment begin to cool and ultimately the corrosive agents condense if the compartment is not put back on line before the temperature of the gases drops below the dew point.

In addition to the foregoing, experience has indicated that even greater accumulations of corrosive agents can be expected to form in the isolated compartments as a result of condensation in the flue gases seeping through the dampers closing off the isolated compartments. For example, in a baghouse installation where each compartment is designed to clean about 80,000. ACFM (actual cubic feet per minute) of flue gases, the seepage rate through each of the isolated compartments is in the range of 80–400 ACFM or 0.1–0.5 percent of the gas flowing through the compartment during normal filtering operations. Assuming the flue gases include about 10 parts per million $SO_3$, which is fairly typical for a coal fired boiler, as the isolated compartment cools the filter bags will be exposed to about 15 gallons of sulfuric acid condensing out of the flue gases trapped in the compartment when it was isolated, and 2–10 gallons of acid for each hour the compartment is kept off line.

Considering the above, it can be seen that acid condensation in the isolated compartments can have a very deliterious effect on the life of the filter bags and the metal housing of the baghouse installation, as well as increasing pressure losses in the gases as they flow through the compartments due to deterioration of the filter bags and the accumulation of sulfates and other particulates on the bags which generally cannot be dislodged by conventional bag cleaning procedures.

SUMMARY OF THE INVENTION

The present invention relates to a flue gas cleaning system and in particular to a method and apparatus for minimizing condensation of corrosive agents in the filter compartments of a baghouse installation when one or more of the compartments are taken off line and isolated during filtering operations. This invention is related to the applicant's copending U.S. Patent Applications having Ser. Nos. 310,128 and 310,133 having the same filing date as this application.

In the baghouse installation embodying the invention, flue gases are drawn at subatmospheric pressure from a common inlet manifold into a bank of parallel filter compartments wherein the gases are filtered through a plurality of filter bags. The filtered gases leave the filter compartments and flow into a common outlet manifold from where they are directed into a chemical scrubber or the like prior to discharging them to the atmosphere. In order to maintain a sufficient flow rate in the flue gases as they flow through the compartments when the flow rate of the flue gases drops due to a reduced load on the boiler served by the baghouse installation, one or more of the filter compartments are taken off line and isolated within the installation. This results in all of the flue gases being directed through the remaining compartments to maintain the flow rate within those compartments at the desired level.

To prevent the flue gases from seeping into the isolated compartments, each of the compartments is provided with an ambient air damper which can be opened to admit ambient air into the compartment to maintain it at atmospheric pressure when it is isolated. Because the inlet and outlet manifolds are at subatmospheric pressures, this arrangement prevents the flue gases from seeping into the isolated compartment from the inlet manifold. The invention also provides for heating the ambient air to a temperature in the vicinity of the dew point temperature of the corrosive agents in the gases. This feature insures that the ambient air does not cool the flue gases trapped in the isolated compartment when it is taken off line to the condensation point of the corrosive agents in the gases.

From the foregoing, it can be seen that the invention contemplates an arrangement which essentially eliminates acid condensation in the filter compartments when they are isolated to accommodate operating the baghouse installation at varying flue gas loads, thereby substantially reducing pressure losses in the flue gases flowing through the installation while increasing the service life of the filter bags; however, it is to be understood that various changes can be made in the arrangement, form, and construction of the apparatus disclosed herein without departing from the spirit and scope of the invention.

DESCRIPTION OF THE PREFERRED EMBODIMENT

Figure 1:
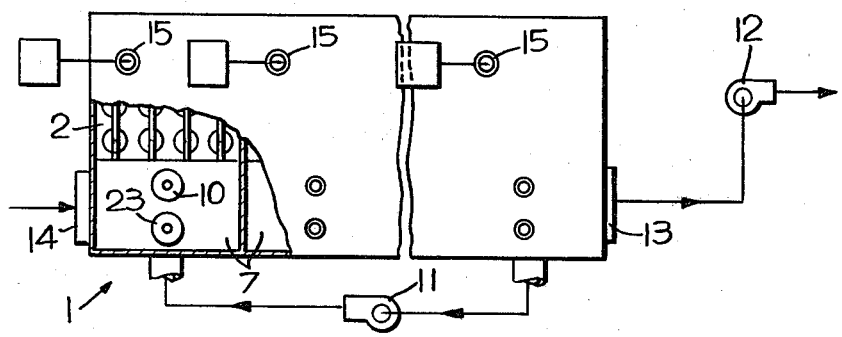
FIG. 1 is a top plan view, partially in section, of the baghouse installation embodying the invention.
Figure 2:
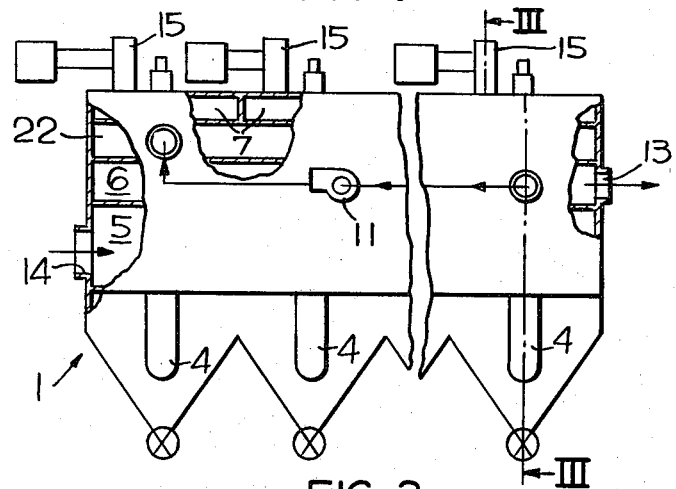
FIG. 2 is a front elevational view, partially in section, of the baghouse installation shown in FIG. 1.
Figure 3:
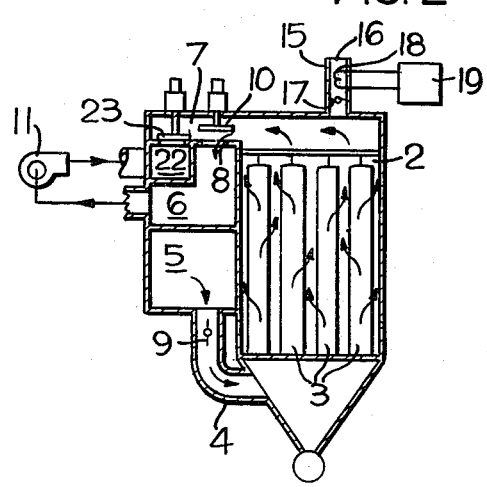
FIG. 3 is a cross-sectional view taken substantially along line III—III in FIG. 2.

Referring to FIGS. 1-3, the baghouse installation 1 incorporating the isolation system embodying the invention includes a plurality of adjacent filter compartments 2 having a plurality of tubular filter bags 3 suspended within them to filter hot flue gases flowing through the compartments in the conventional manner. Each of the filter compartments 2 is connected through a separate inlet duct 4 to a common inlet manifold 5 and to a common outlet manifold 6 through a separate outlet passage 7 opening into the outlet manifold through an outlet port 8. The inlet ducts 4 are each provided with a conventional butterfly-type damper 9 which can be manipulated to close off the inlet duct, and each of the outlet ports 8 has a poppet-type damper 10 similar to that shown in U.S. Pat. No. 3,898,997 overlying it for selectively closing off the outlet ports 8. As will be described, these dampers allow the filter compartments to be taken off line or isolated while keeping the other compartments in service. Additionally, as discussed in the applicant's copending patent applications noted above, the installation includes a blower 11 and associated ducting which is adapted to draw a stream of filtered gases from the outlet manifold 6 and direct it into a common reverse gas manifold 22. This arrangement accommodates periodic cleaning of the filter bags in each of the compartments by closing the outlet damper 10 of the compartment and opening an associated damper 23 on the reverse gas manifold to allow a countercurrent stream of filtered gases to flow through the filter bags in each of the compartments from the reverse gas manifold.

As shown in the drawings, a blower or fan 12 is connected to an outlet 13 at one end of the outlet manifold 6 to maintain a draft in the filter compartments which draws the flue gases into the inlet manifold 5 through an inlet 14 in the end of the inlet manifold. The flue gases in the inlet manifold 5 are drawn by the draft into the filter compartments 2 through the inlet ducts 4 whereafter they flow through the filter bags and into the outlet manifold 6 via the outlet passages 7 and the outlet ports 8. In this regard, it should be noted that the blower 12 is sized to maintain the gases within the manifolds and the filter compartments at subatmospheric pressures. For example, in a baghouse installation wherein each of the filter compartments contains 400 tubular filter bags made of fiberglas cloth providing about 100 square feet of filter media per bag and which is adapted to filter approximately 80,000 ACFM (actual cubic feet per minute) of flue gases, the blower should maintain a pressure of about $-13$ inches water gauge in the outlet manifold. That results in a pressure of about $-7$ inches water gauge in the inlet manifold due to pressure losses in the gases as they flow through the filter compartments. Typically, when fiberglas bags are used the pressure differential between the inlet and outlet manifolds should be in the range of 4-7 inches water gauge.

As noted above in regard to the prior art, when the total volumetric flow rate of the flue gases entering the inlet manifold falls below a predetermined level due to a reduced load on the boilers served by the baghouse installation, it has been the practice to take one or more of the filter compartments off line by isolating them within the system. This maintains a relatively constant gas flow within the remaining compartments still on line to prevent the development of stagnate gas zones within the compartments which experience has shown promotes localized cooling of the gases and thus condensation of the corrosive agents within the compartments.

In practice, the flow rate of the flue gases within the compartments is characterized by the air-to-cloth ratio of the installation which is defined as the total volumetric flow rate of the flue gases passing through the compartments divided by the total area of filter media in use. In the foregoing example, assuming that baghouse installation is designed to filter flue gases having a high sulfide content entering the compartment at a temperature in the range of 260°-350° F., the air-to-cloth ratio should be maintained in the range of 1.7-2.2:1. For example, in a baghouse installation having ten filter compartments designed to filter flue gases flowing at 800,000 ACFM, the filter bags in each compartment should provide about 40,000 square feet of media in order to maintain an air-to-cloth ratio of 2:1. However, if the flow rate of the flue gases from the boiler served by the baghouse installation drops by 25 percent, the air-to-cloth ratio characterizing the gas flow within the compartments would drop proportionally to about 1.5:1. At that level, dead or stagnate gas zones will tend to develop in the compartments which in turn leads to acid condensation. Therefore, to maintain the gas flow above this level and thus prevent condensation within the compartments, one or more of the compartments are isolated to maintain the gas flow in the remaining compartments at an acceptable level. In this case, isolating one of the compartments will maintain the gas flow at a rate providing an air-to-cloth ratio of about 1.9:1 which is well within the range of 1.7-2.2:1 which experience has shown to be appropriate for this type of installation.

Although isolating one of the compartments retards condensation in the remaining compartments still on line, flue gases seeping through the inlet and outlet dampers 9 and 10 of the isolated compartment tend to increase condensation in that compartment. This occurs when the compartment is taken off line because the flue gases trapped in the compartment begin to cool, and as a result of condensation in the flue gases seeping through the closed inlet and outlet dampers due to the pressure differential between the inlet and outlet manifolds. By way of illustration, assuming the flue gases in the foregoing system include 10 parts per million $SO_3$ with a dew point temperature of approximately 230° F., up to 15 gallons of sulfuric acid having a pH of 2.1 could be expected to condense in the isolated compartments as it cools, and additionally, condensation in the flue gases seeping into the compartment could be expected to add an additional 2-10 gallons of acid for each hour the compartment is isolated. Clearly, these are very substantial quantities of acid which would have a very deleterious effect on the life of the filter bags and the metal housing of the compartment, as well as increasing pressure losses within the compartment due to the resulting deterioration of the filter bags and the accumulation of sulfates and other particulates on the bags which generally cannot be dislodged by the conventional bag cleaning procedures currently in use.

Figure 4:
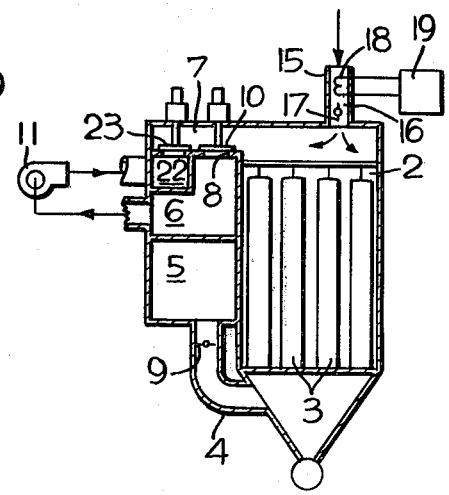
FIG. 4 is a view similar to FIG. 3 showing one of the filter compartments when it is isolated and charged with heated ambient air to prevent flue gases from seeping into the compartment.

To prevent the flue gases from seeping into the compartments when they are isolated, as well as to prevent condensation in the flue gases already in the isolated compartments, each of the compartments is provided with an ambient air damper assembly having a housing 15 providing a conduit 16 through which ambient air can be admitted into each of the compartments when it is isolated. As shown in the drawings, a butterfly-type damper 17 is mounted within the housing 15 which closes off the conduit 16 during normal filtering operations as shown in FIG. 3. However, when the inlet and outlet dampers 9 and 10 of one of the compartments are closed to isolate that compartment, the damper 17 can be opened to vent the compartment to the atmosphere as shown in FIG. 4. This allows ambient air to flow into the isolated compartment and maintain it at atmospheric pressure. Because the inlet and outlet manifolds are at subatmospheric pressures, this arrangement prevents the flue gases from seeping into the isolated compartment, thereby eliminating acid condensation resulting from flue gases seeping into the compartment.

The invention also provides for heating the ambient air to a temperature in the vicinity of the dew point temperature of the corrosive agents in the flue gases as it flows through the conduit 16 into the isolated compartment. This feature insures that the ambient air does not cool the flue gases in the isolated compartment to the condensation point of the corrosive agents. Although this feature may not be required in systems where the compartment is isolated for a relatively short time and the operating temperature of the compartment during normal filtering operations is significantly higher than the dew point temperature of the corrosive agents, it is particularly desirable in systems where the filter compartments must be taken off line for extended periods of time. As shown in the drawings, a heating element 18 connected to a conventional power source 19 is mounted within the conduit 16 to heat the air as it flows into the compartment. Typically, in baghouse installations for cleaning flue gases having substantial sulfide concentrations such as in the foregoing example, the ambient air would be heated to a temperature in the range of 245°–335° F., it being noted that the heating element 18 and power source 19 can be selected from any one of a variety of commercially available gas heating devices.

From the above, it can be seen that when it is desired to put an isolated compartment back on line, the operator simply closes the air damper 17 and shuts off the heating element 18, whereafter the operator opens the inlet and outlet dampers 9 and 10 to resume normal filtering operations within the compartment.

The embodiments of the invention in which an exclusive property or privilege is claimed are defined as follows:

1. In a method for isolating a filter compartment in a baghouse installation having a plurality of parallel filter compartments wherein hot dirty gases containing corrosive agents flow through an inlet in each of the filter compartments from a common inlet manifold maintained at a pressure below ambient pressure, and wherein the dirty gases are filtered through a plurality of filter bags as they flow through each of the compartments and ultimately flow out of the compartments through an outlet in each of the compartments into a common outlet manifold, the improvement comprising closing the inlet and outlet of said compartment to prevent the flow of dirty gases into the compartment, and thereafter heating a stream of ambient air to a temperature near the dew point temperature of the corrosive agents in the dirty gases and admitting it into said compartment to form a pressure barrier within said compartment, thereby essentially eliminating seepage of dirty gases through the closed inlet and outlet of said compartment while minimizing condensation of said agents within said compartment.

2. The method of claim 1, and isolating a predetermined number of the compartments to maintain a preselected gas flow along the filter bags within each of the compartments.

3. The method of claim 1, and isolating a predetermined number of the compartments to maintain the temperature of the gases in the remaining compartments above the dew point temperature of the corrosive agents in said gases.

4. The method of claim 1 wherein the dirty gases are flue gases containing sulfur oxides.

5. The method of claim 4 and isolating a predetermined number of said compartments to maintain an air-to-cloth ratio in the remaining compartments sufficient to maintain the temperature of the gases in the outlet manifold in the range of 245°–335° F. when the temperature of the gases in the inlet manifold is in the range of 260°–350° F.

6. The method of claim 6, and maintaining a pressure differential between said inlet and outlet manifolds in the range of 4–7 inches water gauge to maintain an air-to-cloth ratio for the installation in the range of 1.7–2.2:1.

7. A baghouse installation for cleaning a stream of hot dirty gases containing corrosive agents comprising:
a plurality of parallel filter compartments, a gas inlet and a gas outlet opening into each of said compartments accommodating the flow of the gas stream through the compartments, and a plurality of filter bags mounted within the compartments adapted to filter the gas stream as it flows through the compartments;
a common inlet manifold connected with each of said inlets for receiving the dirty gas stream and directing it into the filter compartments;
a common outlet manifold connected with each of said outlets for conveying the filtered gases away from the compartments;
blower means connected with said outlet manifold to draw the gases through the compartments at a subatmospheric pressure;
normally open inlet and outlet damper means in the gas inlet and the gas outlet, respectively, of each of the compartments for closing off the inlet and outlet of a predetermined number of the compartments to isolate said compartments within the baghouse installation while accommodating the flow of gases through the remaining compartments;
an air damper assembly connected with each compartment for venting the isolated compartments to the atmosphere to establish a flow of ambient air into each of said compartments to form a pressure barrier within said compartments essentially eliminating seepage of flue gases through the closed inlet; and
air heating means connected with said air damper assembly for heating the ambient air as it enters the isolated compartments to a temperature above the dew point temperature of the corrosive agents in the dirty gases.

* * * * *

UNITED STATES PATENT OFFICE
CERTIFICATE OF CORRECTION

Patent No. 4,376,638          Dated March 15, 1983

Inventor(s) S. Michael Dunseith

It is certified that error appears in the above-identified patent and that said Letters Patent are hereby corrected as shown below:

Column 6, claim 6, line 1, claim "6" should read claim --5--.

Signed and Sealed this

Twelfth Day of July 1983

[SEAL]

Attest:

Attesting Officer

GERALD J. MOSSINGHOFF

Commissioner of Patents and Trademarks